Figure 2:
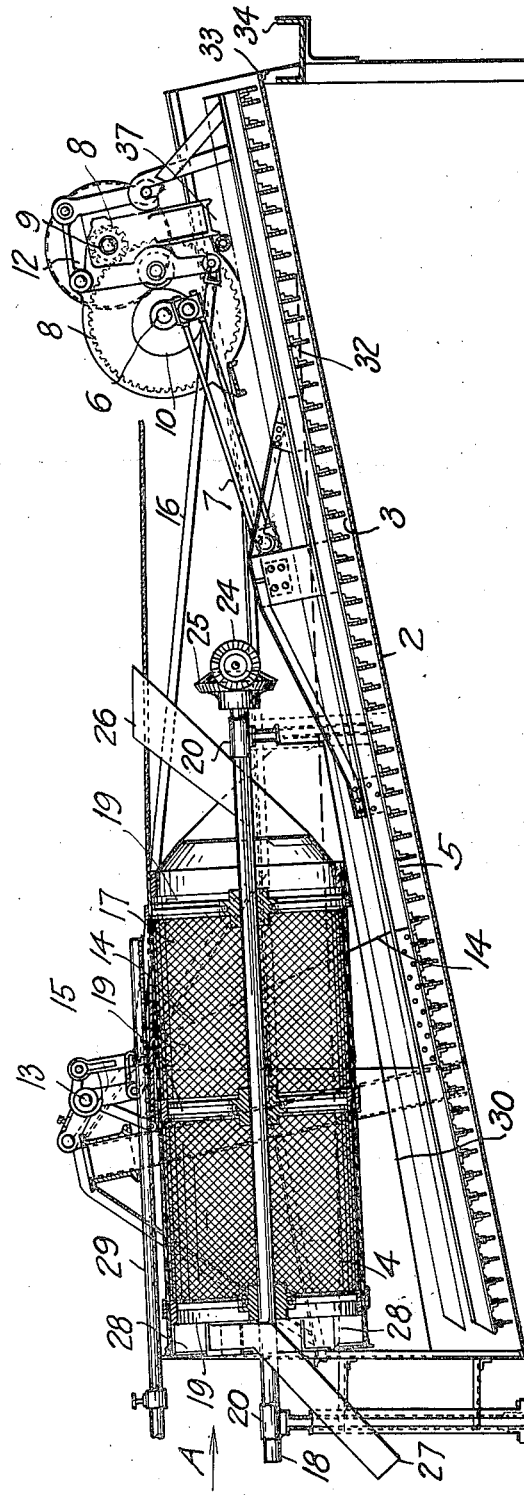

Feb. 13, 1923.
E. W. DAVIS
WASHER AND CLASSIFIER
Filed Nov. 14, 1919
1,445,007
3 sheets-sheet 1
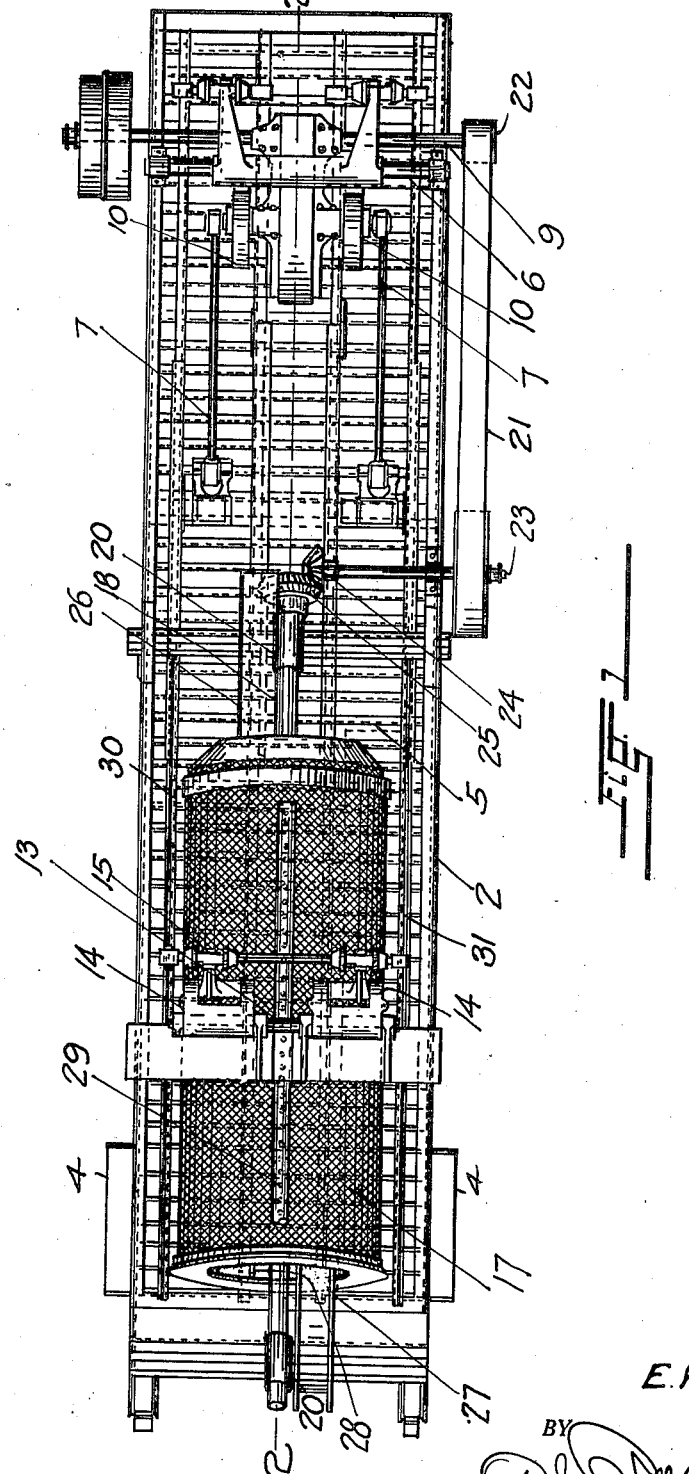
FIG. 1
INVENTOR.
E. W. DAVIS.
BY
ATTORNEY.

Feb. 13, 1923.

E. W. DAVIS

WASHER AND CLASSIFIER

Filed Nov. 14, 1919

1,445,007

3 sheets-sheet 3

INVENTOR.
E. W. DAVIS.
BY
ATTORNEY.

Patented Feb. 13, 1923.

1,445,007

UNITED STATES PATENT OFFICE.

EDWARD W. DAVIS, OF MINNEAPOLIS, MINNESOTA, ASSIGNOR TO THE DORR COMPANY, A CORPORATION OF DELAWARE.

WASHER AND CLASSIFIER.

Application filed November 14, 1919. Serial No. 338,090.

*To all whom it may concern:*

Be it known that I, EDWARD W. DAVIS, a citizen of the United States, residing at Minneapolis, in the county of Hennepin and State of Minnesota, have invented certain new and useful Improvements in Washers and Classifiers, of which the following is a specification.

This invention relates to apparatus for washing and classifying ores and other materials, and its primary object is to provide a machine of simple and practical construction which is particularly adapted to wash and separate earthy materials into various grades according to the size and specific gravity of their particles.

In carrying the present invention into effect, I employ in combination with a settling or subsidence vessel having an overflow and a means for the discharge of settled matter, a rotary cylindrical screen the lower portion of which extends beneath the liquid level of the vessel, established by its overflow.

The material fed into this screen is washed and scoured, and separated in accordance with the size of its particles, the sand and smaller ore particles passing through the meshes of the screen into the settling vessel, while the larger particles are carried to a point of discharge outside the same.

In the settling vessel the material is separated according to the specific gravity of its particles, the coarser and heavier material which settles to the bottom of the vessel being raked to a point of discharge above the liquid level, while the excess water with the finer and lighter material in suspension passes across the overflow.

It will thus be seen that in the operation of the machine, an unsized feed is cleanly divided according to the size and specific gravity of its constituents, into three products, to-wit:

1. The coarse matter which is delivered free from clay and sand at an end of the rotating screen outside of the settling vessel.

2. The fine ore particles which together with the sand are delivered free from water and slimes above the liquid level, and 3. The excess water together with fine material of low specific gravity in suspension, which passes across the overflow.

Without limiting myself to the use of any particular settling vessel possessing the above-described characteristics, I preferably employ in combination with the rotary screen a separating device of the type commonly known as—"Dorr classifiers" in which the settled material is moved along an inclined surface to a point of discharge above the liquid level by the reciprocating motion of a suspended series of spaced traverse members or rakes.

Figure 3:
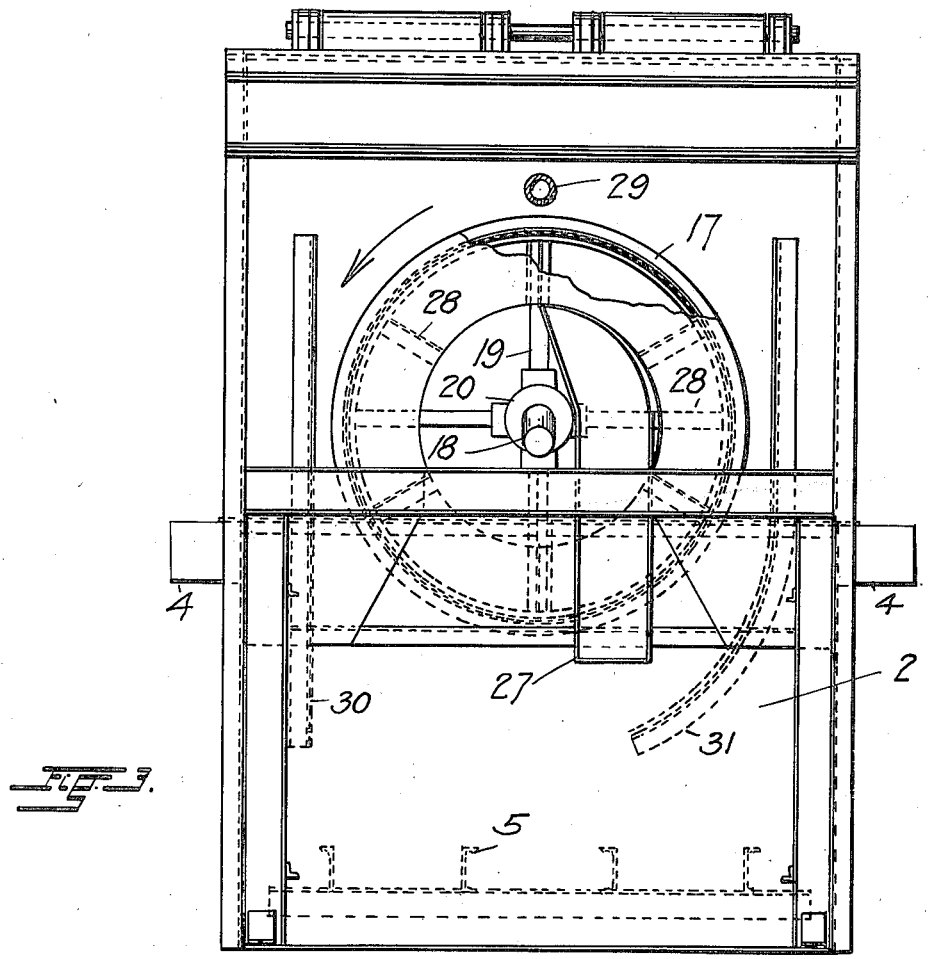
Figure 4:
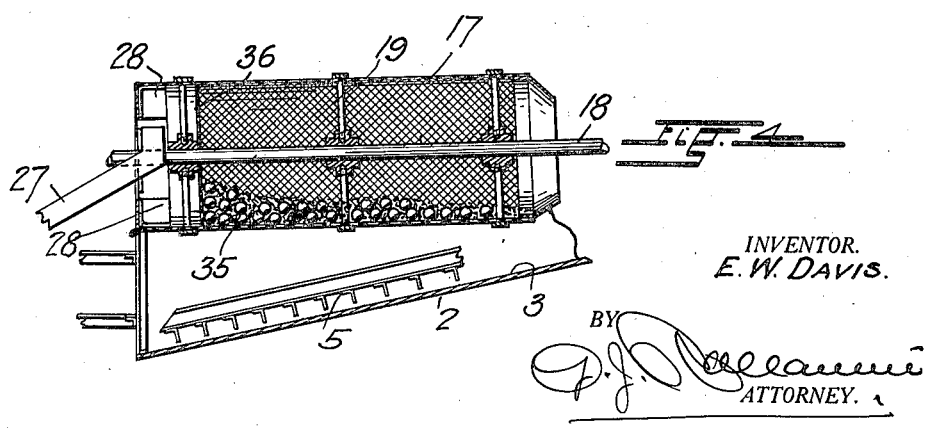

An embodiment of my invention in its preferred form has been illustrated in the accompanying drawings in which similar characters of reference designate corresponding parts throughout the several views, and in which Figure 1 represents a plan view of my improved washer and classifier;

Figure 2, a vertical section taken on the line 2—2, Figure 1;

Figure 3, an enlarged end elevation of the apparatus, looking in the direction of the arrow A, Figure 1, and Figure 4, a fragmentary elevation of the rotating screen and adjoining parts of the settling vessel showing a modification in the construction of the screen.

Referring to the drawings, the reference character 2 designates a classifier of the Dorr type which, briefly, consists of an elongated trough or settling box having an inclined bottom surface 3 and an overflow 4 at a level below an outlet 33 at the upper end thereof, and a conveying element 5 preferably composed of a rake of suitable construction which is movably suspended above the bottom surface of the trough in operative connection with mechanism for its reciprocation.

The operating mechanism consists in the construction shown in the drawings, of a rotary shaft 6 having crank connections with the rake through the intermediary of pitmans 7, gearing 8 for the connection of the crank shaft with a driving shaft 9 and cams 10 which by engagement with oscillating levers 12 connected with the suspension mechanism of the rake, cause the rake to move above the surface of the settling material in the vessel at the end of each effective stroke.

The suspension mechanism includes to this end a rocker shaft 13 having crank connections with hangers 14 on the rake, and bell-cranks 15 which are connected with the before-mentioned oscillating levers through the medium of rods 16. By this construction a reciprocatory movement is imparted to the rake along a path in close proximity to the bottom of the settling vessel during the forward movement of the rake and along a more elevated path with respect to the bottom of the vessel during the backward movement of the rake whereby during its forward movement the rake operates to work settled material upwardly along the inclined bottom of the settling vessel towards the outlet at the upper end, and whereby during its upward and backward movements the rake operates to agitate the liquid in the vessel and thus promotes the washing of the material in the rotating screen.

The rotating screen of my invention consists of a cylindrical trommel 17 made of screen-cloth or perforated sheet metal which is mounted upon a shaft 18 by means of a plurality of spiders 19.

The shaft is mounted in a slightly inclined position in bearings 20 above the trough of the classifier at its lower or overflow end, and it has a gear connection with the above described operating mechanism of the classifier rake through the medium of a driving belt 21. The axis of rotation of this screen is disposed longitudinally with respect to the settling vessel.

The belt which runs over a pulley 22 on the driving shaft of the classifier, transfers the movement thereof to a countershaft 23 which by means of a pair of beveled gears 24 and 25 is operatively connected with the shaft 18 of the trommel.

The unsized material is fed into the screen at its upper end through a feed trough 26 and the coarse product is discharged at its opposite end into a launder 27 by means of a series of lifting buckets 28 formed upon the inner surface of the screen.

A perforated pipe 29 extending longitudinally above and in close proximity to the rotating screen has a valve-controlled connection with a conveniently located source of supply to provide part of the water required in the operation of the machine, and a pair of baffles 30 and 31 extend downwardly in the settling trough at opposite sides of the submerged portion of the screen, their principal function being to restrict the movement of the material passing through the screen to the settling region immediately beneath the same and thereby expedite the settling action.

The baffle 31 rearward of the screen, with relation to its direction of rotation, is curved inwardly at its lower end to assist in evenly distributing suspended matter over the settling area of the trough.

The effect of the baffles 30 and 31 is to enclose the rotary screen in a compartment from which there is no effective outlet except beneath the baffles. By adding fresh water in this compartment the current is caused to be downward and all fine suspended material tends to travel in that direction. For this reason as soon as any material is freed by the action of the screen and passes into the compartment between the baffles 30 and 31 the tendency is for this material to immediately settle away from the screen. The agitation caused by the rotation of the screen keeps some very fine particles in suspension in this compartment, but all sandy material immediately settles out and the density of the pulp within this compartment is very much lower than that of the pulp discharged from the settling vessel through the overflows 4. This is an important effect as the same water is used over many times in this compartment and remains sufficiently free from slime to wash effectively the large pieces of ore.

In the operation of my improved classifier the material entering the rotating screen through the feed trough is immediately submerged in water, the broken line 32 in Figure 2 of the drawings indicating the water level established by the overflow, which as shown is a relatively short distance above the bottom of the screen.

The cascading and abrading action of the particles as they are tumbled in the trommel, together with the washing action of the water which is constantly agitated by the movement of the trommel and the rake, cause the ore particles to be freed from the adherent sand and clay and to be divided into an undersize which passes through the meshes of the screen and an oversize which is lifted by the buckets at the lower end of the screen and deposited in the launder 27 which carries it outside the settling trough free from sand and other extraneous matter and in a practically dry condition.

The sand and fines passing through the meshes of the screen into the settling region defined by the baffles, subside to the inclined bottom of the trough according to their specific gravity.

The material that settles to the bottom of the vessel is moved to the point of discharge 33 above the water level by the reciprocating action of the rakes and delivered into a subjacent launder 34 in a practically dry condition, and the lighter material which owing to its low specific gravity remained in suspension is, together with the excess water, discharged across the overflow 4.

By adding fresh water to the material through the perforated pipe above the screen, the overflow is made continuous and uniform and a downward current is created in the compartment between the baffles to expedite the settling action of the particles in the undersize of the material which passed through the meshes of the screen.

It will be understood that owing to the practically immediate downward movement of the sand and heavy material in the compartment below the screen, the density of the pulp inside the compartment is very much lower than that of the overflowing pulp which is an important factor in the operation of the apparatus inasmuch as it permits of the same water being used repeatedly to wash the larger pieces of ore in the rotating screen.

In case the feed does not contain a sufficient amount of coarse material to produce its own abrading effect, balls or pebbles 35 may be placed inside the trommel and a screen 36 placed across the discharge opening of the same as shown in Figure 4 of the drawings.

The machine as described is particularly adapted for the treatment of sandy iron ores in which the fine material is of a very low grade, the two products delivered at the end of the screen and at the upper end of the settling box being a good grade of concentrate practically free from fine material while the low grade matter passes across the overflow into the tailings.

The improved classifier is both a washing and classifying machine and by changing the slope of the trommel the action may be expedited or retarded according to the nature of the material under treatment.

In addition to the water constantly supplied through the perforated pipe 29 above the trommel, it is desirable in most cases to have a water spray at the point where the material carried out by the rakes leaves the solution level in order to carry back all of the finer materials that are carried up with the rakes.

This finer material may be enclosed mechanically with the coarser particles and the water spray has the effect of carrying the finer materials back into the bath eventually overflowing from the overflow end of the classifier.

The water spray is supplied through a perforated pipe 37 located at the upper end of the classifier above the water level.

What I claim is:

1. An apparatus of the character described, comprising a settling vessel having an inclined bottom, a plurality of spaced transverse members operatively mounted in proximity to said inclined bottom, means for imparting a reciprocatory movement to said members along a path in close proximity to said bottom during the forward movement of the members and along a more elevated path with respect to said bottom during the backward movement of the members in the course of which the members move settled material upwardly along said inclined bottom and agitate the liquid, a hollow rotary screen so mounted in the lower end of said vessel as to be partly beneath the normal operating level of the liquid in the vessel whereby material passing through the screen forms the feed for said settling vessel, means for feeding material to be treated to the interior of said screen, and means for discharging oversize material from one end of said screen.

2. An apparatus of the character described, comprising an elongated settling vessel having an inclined bottom, a plurality of spaced transverse members operatively mounted in proximity to said inclined bottom, means for imparting a reciprocatory movement to said members along a path in close proximity to said bottom during the forward movement of the members and along a more elevated path with respect to said bottom during the backward movement of the members in the course of which the members move settled material upwardly along said inclined bottom and agitate the liquid, means permitting the overflow of liquid from said vessel at a lower level than the upper end of said inclined bottom, a hollow cylindrical screen rotatably mounted within said vessel with its axis disposed longitudinally with respect to the vessel and so positioned as to be partly beneath the normal operating level of the liquid in the vessel whereby material passing through the screen forms the feed for said settling vessel, means for feeding material to be treated to the interior of said screen, and means for discharging over-size material from one end of said screen.

3. An apparatus of the character described, comprising an elongated settling vessel having an inclined bottom with a solids outlet at its upper end and provided near its lower end with means permitting the overflow of liquid from the vessel at a level lower than said solids outlet, a plurality of spaced transverse members operatively mounted in proximity to said inclined bottom, means for imparting a reciprocatory movement to said members in the course of which they move forwardly in close proximity to said bottom and thereby operate to work settled material upwardly along the inclined bottom towards said solids outlet also in the course of which they move backwardly along a more elevated path and thereby operate to agitate the liquid, a hollow cylindrical screen rotatably mounted within said vessel with its axis of rotation disposed longitudinally with respect to said vessel and so positioned as to be partly beneath the normal operating level of the liquid in the vessel whereby the material passing through the screen constitutes the feed for said settling vessel, means for feeding material to be treated to the interior of said screen, and means for discharging oversize material from one end of said screen.

4. An apparatus of the character described, comprising a settling vessel having an inclined bottom with a solids outlet at its upper end and provided with means permitting the overflow of liquid from the vessel at a level lower than said solids outlet, a plurality of spaced transverse members operatively mounted in proximity to said inclined bottom, means for imparting a reciprocatory movement to said members in the course of which they move forwardly in close proximity to said bottom and thereby operate to work settled material upwardly along the inclined bottom towards said solids outlet also in the course of which they move backwardly along a more elevated path and thereby operate to agitate the liquid, a hollow screen rotatably mounted within said vessel and so positioned as to be partly beneath the normal operating level of the liquid in the vessel whereby the material passing through the screen constitutes the feed for said settling vessel, a baffle arranged along each side of said screen and extending downwardly from above the normal operating level of the liquid in said vessel to below the level of the submerged portion of the screen, means for feeding material to be treated to the interior of said screen, and means for discharging over-size material from one end of said screen.

5. An apparatus of the character described, comprising an elongated settling vessel having an inclined bottom with a solids outlet at its upper end and provided with means permitting the overflow of liquid from the vessel at a level lower than said solids outlet, a plurality of spaced transverse members operatively mounted in proximity to said inclined bottom, means for imparting a reciprocatory movement to said members in the course of which they move forwardly in close proximity to said bottom and thereby operate to work settled material upwardly along the inclined bottom towards said solids outlet also in the course of which they move backwardly along a more elevated path and thereby operate to agitate the liquid, a hollow cylindrical screen rotatably mounted within said vessel with its axis of rotation longitudinally disposed with respect to said vessel and so positioned as to be partly beneath the normal operating level of the liquid in the vessel whereby the material passing through the screen constitutes the feed for said settling vessel, means positioned above said screen for supplying water to said vessel, means for feeding material to be treated to the interior of said screen, and means for discharging oversize material from one end of said screen.

6. An apparatus of the character described, comprising an elongated settling vessel having an inclined bottom with a solids outlet at its upper end and provided with means permitting the overflow of liquid from the vessel at a level lower than said solids outlet, a plurality of spaced transverse members operatively mounted in proximity to said inclined bottom, means for imparting a reciprocatory movement to said members in the course of which they move forwardly in close proximity to said bottom and thereby operate to work settled material upwardly along the inclined bottom towards said solids outlet also in the course of which they move backwardly along a more elevated path and thereby operate to agitate the liquid, a hollow cylindrical screen rotatably mounted within said vessel with its axis of rotation disposed longitudinally with respect to said vessel and so positioned as to be partly beneath the normal operating level of the liquid in the vessel whereby the material passing through the screen constitutes the feed for said settling vessel, a baffle arranged along each side of said screen and extending downwardly from above the normal operating level of the liquid in said vessel to below the level of the submerged portion of the screen and forming a compartment below the screen from which there is no effective outlet except beneath the baffles, means positioned above said screen for supplying water to the compartment formed by said baffles, means for feeding material to be treated to the interior of said screen, and means for discharging over-size material from one end of said screen.

7. An apparatus of the character described, comprising a settling vessel having an inclined bottom with a solids outlet at its upper end and provided with means permitting the overflow of liquid from the vessel at a level lower than said solids outlet, a plurality of spaced transverse members operatively mounted in proximity to said inclined bottom, means for imparting a reciprocatory movement to said members in the course of which they move forwardly in close proximity to said bottom and thereby operate to work settled material upwardly along the inclined bottom towards said solids outlet also in the course of which they move backwardly along a more elevated path and thereby operate to agitate the liquid, a hollow screen rotatably mounted within said vessel and so positioned as to be partly beneath the normal operating level of the liquid in the vessel whereby the material passing through the screen constitutes the feed for said settling vessel, a plurality of abrasive bodies arranged in the interior of said screen, means for feeding material to be treated to the interior of said screen, and means for discharging over-size material from one end of said screen.

8. An apparatus of the character described, comprising an elongated settling vessel having an inclined bottom with a solids outlet at its upper end and provided with means permitting the overflow of liquid from the vessel at a level lower than said solids outlet, a plurality of spaced transverse members operatively mounted in proximity to said inclined bottom, means for imparting a reciprocatory movement to said members along a path in close proximity to said bottom during the forward movement of the members and along a more elevated path with respect to said bottom during the backward movement of the members whereby during their forward movement said members operate to work settled material upwardly along said inclined bottom towards said solids outlet and during their backward movement they operate to agitate the liquid, a hollow cylindrical screen operatively mounted for rotation within said vessel with its axis of rotation disposed longitudinally with respect to said vessel and so positioned as to be partly beneath the normal operating level of the liquid in the vessel whereby material passing through the screen forms the feed for said settling vessel, means for feeding material to be treated to the interior of said screen, and means for discharging over-size material from one end of said screen.

In testimony whereof I have affixed my signature.

EDWARD W. DAVIS.